(12) United States Patent
Mandelbaum et al.

(10) Patent No.: US 6,307,959 B1
(45) Date of Patent: Oct. 23, 2001

(54) METHOD AND APPARATUS FOR ESTIMATING SCENE STRUCTURE AND EGO-MOTION FROM MULTIPLE IMAGES OF A SCENE USING CORRELATION

(75) Inventors: Robert Mandelbaum, Bala Cynwyd, PA (US); Garbis Salgian, Hamiton; Harpreet Singh Sawhney, West Windsor Township, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/616,005

(22) Filed: Jul. 13, 2000

Related U.S. Application Data
(60) Provisional application No. 60/143,747, filed on Jul. 14, 1999.

(51) Int. Cl.[7] .................................................. G06T 17/00
(52) U.S. Cl. .......................... 382/154; 382/104; 382/153; 382/278
(58) Field of Search ...................................... 382/103, 107, 382/104, 153, 154, 278, 260, 289, 295, 296, 299; 250/559.33; 348/116, 119, 47–50, 94, 95; 356/612, 614, 394; 901/47; 701/300, 301; 702/152, 153; 700/253, 255, 259

(56) References Cited

U.S. PATENT DOCUMENTS

| | | | |
|---|---|---|---|
| 4,797,942 | 1/1989 | Burt | 382/41 |
| 4,799,267 | * 1/1989 | Kamejima et al. | 382/1 |

(List continued on next page.)

FOREIGN PATENT DOCUMENTS

| | | | |
|---|---|---|---|
| 0 786 739 A2 | 7/1997 | (EP) | G06T/7/20 |
| 0 898 234 A1 | 2/1999 | (EP) | G06T/7/00 |

OTHER PUBLICATIONS

Stefan Baten et al., Techniques for Autonomous, Off–Road Navigation, IEEE Intelligent Systems, Nov./Dec. 1998, pp. 57–65.*

(List continued on next page.)

Primary Examiner—Amelia M. Au
Assistant Examiner—Brian P. Werner
(74) Attorney, Agent, or Firm—William J. Burke

(57) ABSTRACT

A system that estimates both the ego-motion of a camera through a scene and the structure of the scene by analyzing a batch of images of the scene obtained by the camera employs a correlation-based, iterative, multi-resolution algorithm. The system defines a global ego-motion constraint to refine estimates of inter-frame camera rotation and translation. It also uses local window-based correlation to refine the current estimate of scene structure. The batch of images is divided into a reference image and a group of inspection images. Each inspection image in the batch of images is aligned to the reference image by a warping transformation. The correlation is determined by analyzing respective Gaussian/Laplacian decompositions of the reference image and warped inspection images. The ego-motion constraint includes both rotation and translation parameters. These parameters are determined by globally correlating surfaces in the respective inspection images to the reference image. Scene structure is determined on a pixel-by-pixel basis by correlating multiple pixels in a support region among all of the images. The correlation surfaces are modeled as quadratic or other parametric surfaces to allow easy recognition and rejection of outliers and to simplify computation of incremental refinements for ego-motion and structure. The system can employ information from other sensors to provide an initial estimate of ego-motion and/or scene structure. The system operates using images captured by either single-camera rigs or multiple-camera rigs.

26 Claims, 4 Drawing Sheets

U.S. PATENT DOCUMENTS

| | | | | |
|---|---|---|---|---|
| 5,202,928 | | 4/1993 | Tomita et al. | 382/1 |
| 5,259,040 | * | 11/1993 | Hanna | 382/41 |
| 5,818,959 | | 10/1998 | Webb et al. | 382/106 |
| 6,047,078 | * | 4/2000 | Kang | 382/107 |

OTHER PUBLICATIONS

Sull, et al. "Estimation of Motion and structure of planar surfaces from a sequence of monocular images," Proc Comp Soc Conf on Comp Vision and Pattern Recognition, US, Los Alamitos, IEEE, Comp. Soc. Press, Jun. 1, 1991 p. 732–733.

K. J. Hanna et al. "Combining Stereo and Motion Analysis for Direct Estimation of Scene Structure," Proceedings of the International Conference on Computer Vision, pp. 357–365, 1993.

K.J. Hanna, "Direct multi-resolution of ego-motion and structure from motion," Proceedings of the IEEE Workshop on Visual Motion, pp. 156–162, 1991.

J. R. Bergen et al., "Hierarchical Model-Based Motion Estimation," Proceedings of European Conference Computer Vision, 1992.

R. Cipolla et al., "Robust structure from motion using motion parallax," Proceedings of the Fourth International Conference on Computer Vision, pp. 374–382, Apr. 1993.

M. Irani, "Isolating Multiple 2D Image Motions for Image Enhancement and for 3D Motion Analysis," Scientific Council of the Hebrew University of Jerusalem.

H.S. Sawhney, "Simplifying multiple motion and structure analysis using planar parallax and image Warping," Proceedings of the 1994 IEEE Workshop on Motion of Non–Rigid and Articulated Objects, pp. 104–109.

R. Kumar et al., "Sensitivity of the pose refinement problem to accurate estimation of camera parameters," Proceedings in the Third International Conference on Computer Vision, pp. 365–369, 1990.

Mandelbaum, et al., "Terrain Reconstruction for Ground and Underwater Robots," Proc. IEEE Intl Conf. On Robotics and Automation, San Francisco, CA Apr. 22–28, 2000.

Mandelbaum, et al., "Correlation-Based Estimation of Ego-motion and Structure from Motion and Stereo," Proc. ICCV, Kerkyra, Greece, Sep. 1999.

Salgian, "Extended Terrain Reconstruction for Autonomous Vehicles," SPIE Proc., v 4023, Enchanced and Synthetic Vision 2000, Oralndo, Florida, Apr. 24–28, 2000.

* cited by examiner

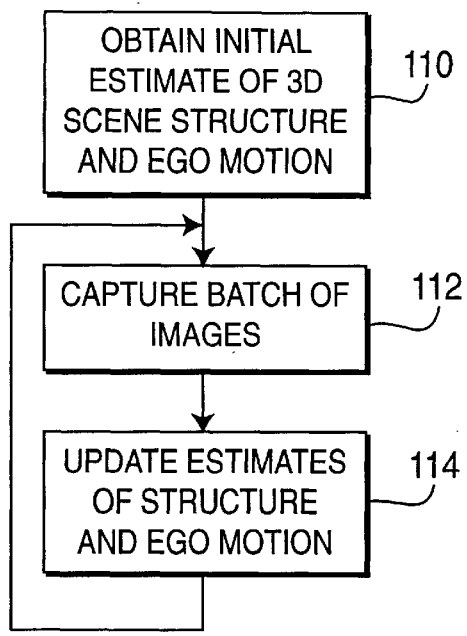
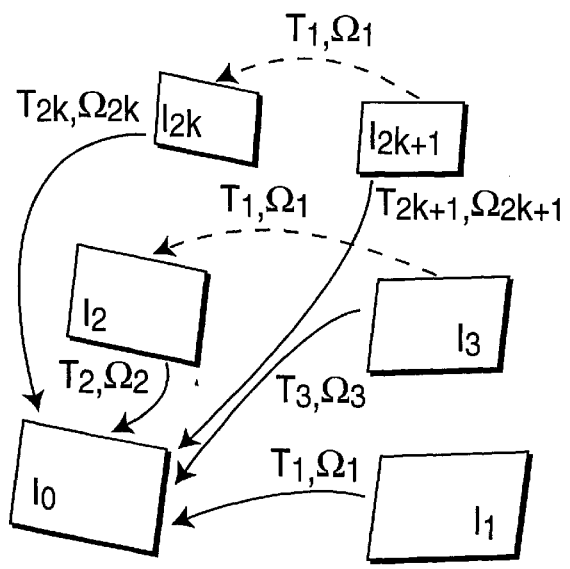
FIG. 1
FIG. 4
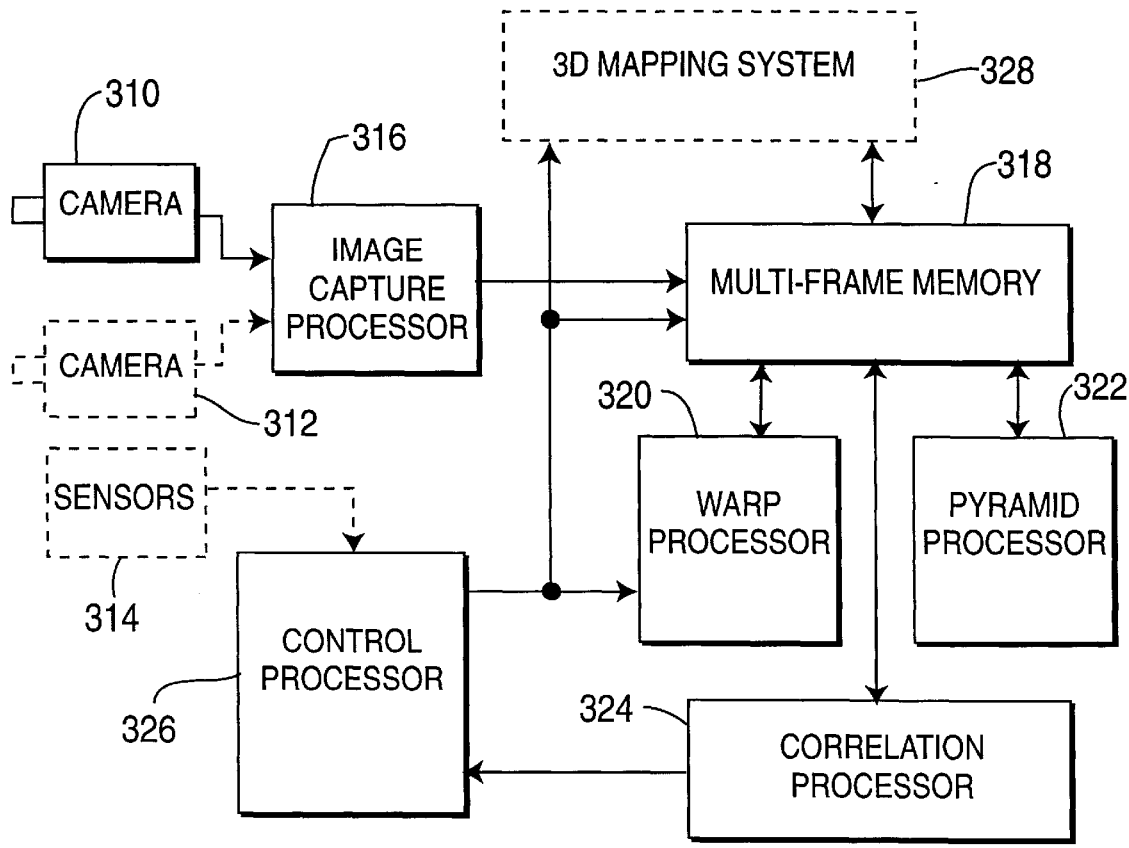
FIG. 3

METHOD AND APPARATUS FOR ESTIMATING SCENE STRUCTURE AND EGO-MOTION FROM MULTIPLE IMAGES OF A SCENE USING CORRELATION

This application claims benefit of the filing date of Provisional Application No. 60/143,747 filed Jul. 14, 1999, the contents of which are incorporated herein by reference.

The invention was made under U.S. Government Contract No. DAAL01-98-C-0049 awarded by the Department of the Army. The U.S. Government has rights in the invention.

BACKGROUND OF THE INVENTION

The present invention concerns machine vision and in particular, a correlation-based method and apparatus for processing a group of images of a scene to concurrently and iteratively obtain estimates of ego-motion and scene structure.

In machine vision applications, the motion of the camera rig moving through an environment (ego-motion) provides useful information for tasks such as navigation and self-localization within a map. Similarly, recovering the structure of the environment may be useful for tasks such as obstacle avoidance, terrain-based velocity control, and three-dimensional (3D) map construction. In general, the problems of estimating ego-motion and structure from a sequence of two-dimensional (2D) images are mutually dependent. Prior accurate knowledge of ego-motion allows structure to be computed by triangulation from corresponding image points. This is the principle behind standard parallel-axis stereo algorithms, where the baseline is known accurately from calibration. In this case, knowledge of the epipolar geometry provides an efficient mechanism for determining scene structure by searching for corresponding points.

If, on the other hand, prior information is available regarding the structure of the scene, then the ego-motion can be computed directly. Essentially, the space of all possible poses of the camera is searched for the pose for which the perspective projection of the environment onto the image plane most closely matches each image in the sequence of images. The ego-motion is the path from one pose to the next.

It is more difficult to obtain accurate estimates of both ego-motion and structure by analyzing a sequence of 2D images in which neither is known. Generally, algorithms that attempt to perform this function fall into two classes: (i) those that use the epipolar constraint and assume that the motion field is available, and (ii) those that utilize the "positive depth" constraint, also known as "direct" algorithms. A correlation-based approach is described in an article by M. Irani et al. entitled "Robust multi-sensor image alignment," *Proceedings of the Sixth International Conference on Computer Vision (ICCV'98)*, pp. 959–965, January 1998. This system uses correlation to align images obtained from multiple modalities (e.g. from visible and IR cameras). The described method, however uses a 2D motion model. In addition, Beaudet masks are employed to estimate first and second derivatives of the correlation surface.

Another system is described in an article by K. J. Hanna et al. entitled "Combining Stereo and Motion Analysis for Direct Estimation of Scene Structure," *Proceedings of the International Conference on Computer Vision*, pp. 357–365, 1993. The system described in this paper relies on the image-brightness constraint and stereo image processing techniques to align images and determine scene structure.

SUMMARY OF THE INVENTION

The present invention is embodied in a correlation-based, iterative, multi-resolution algorithm that estimates both scene structure and the motion of the camera rig through an environment from a stream of images captured while the camera is moving through the environment.

The exemplary method uses a global ego-motion constraint to refine estimates of inter-frame camera rotation and translation. It also uses local window-based correlation to refine the current estimate of scene structure.

According to one aspect of the invention, each inspection image in the stream of images is aligned to a reference image by a warping transformation. The correlation is determined by analyzing respective Gaussian and Laplacian decompositions of the reference image and warped inspection images.

According to another aspect of the invention, the rotation and translation parameters of the warping transformation are determined by correlating regions in the respective inspection images to corresponding regions in the reference image.

According to yet another aspect of the invention, scene structure is determined on a pixel-by-pixel basis by correlating multiple pixels in a support region According to another aspect of the invention, the correlation surfaces are modeled as parametric surfaces to allow easy recognition and rejection of outliers and to simplify computation of incremental refinements for ego-motion and structure.

According to another aspect of the invention, the method employs information from other sensors to provide an initial estimate of ego-motion and/or scene structure.

According to yet another aspect of the invention, the method operates using images captured by either single-camera rigs or multiple-camera rigs.

BRIEF DESCRIPTION OF THE DRAWING

FIG. 1 is a flow-chart diagram that illustrates the overall operation of the inventive method.

FIG. 3 is a block diagram of an exemplary image processing system suitable for use with the subject invention.

FIG. 4 is a perspective view of multiple images that is useful for describing the operations performed by the warp processor shown in FIG. 3.

DETAILED DESCRIPTION OF THE INVENTION

Figure 2:
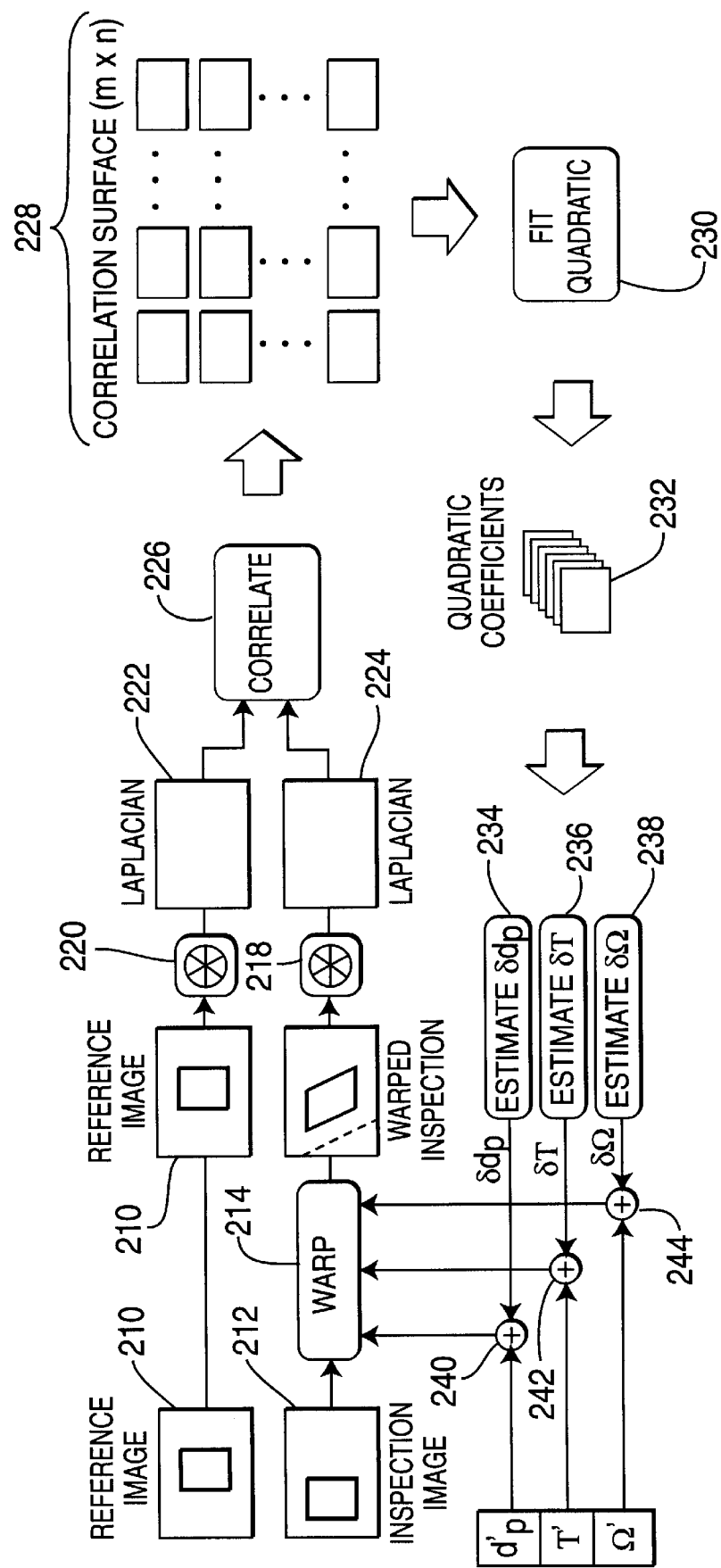
FIG. 2 is a functional block diagram that is useful for describing the step of updating the estimates of image structure and ego-motion shown in FIG. 1.

The subject invention is embodied in a method that concurrently estimates the motion of a camera through a scene where neither accurate a priori ego-motion nor structure information is available. The exemplary method uses a correlation-based algorithm that assumes a very coarse initial estimate for both ego-motion and structure, and then alternately and iteratively refines the estimates of both. The updated estimate of ego-motion is used to obtain an improved estimate of structure, which, in turn, is used to refine the estimate of ego-motion.

Although the exemplary method does use the epipolar constraint, it does not solve for optical flow as an intermediate step. Consequently, the method avoids problems associated with flow estimation. Instead, the subject invention employs a correlation-based approach, in which each correlation surface is modeled as a quadratic surface. The use of the quadratic surface allows the use of a full second-order model to estimate ego-motion and structure. That is to say, the exemplary method uses the full shape of the correlation surface and not just the location parameter, as in optical-flow techniques. By modeling the correlation surfaces as quadratic surfaces, the exemplary method identifies and rejects outlier surfaces that do not represent good correlations.

An exemplary application of this algorithm is in analysis and control of the outdoor mobility of autonomous vehicles. Within this context, the subject invention provides a unified approach to processing image streams from the vehicle's navigation and surveillance cameras, which addresses the following issues:

1. Detection, segmentation, and representation of moving objects: For the sake of self-preservation and safe operation among human personnel, the vision system is desirably able to operate in dynamic environments, and can detect other moving vehicles and personnel.

2. Extended terrain representation: The algorithm is desirably able to register imagery and integrate information over time. In this way, a coherent representation of the environment can be incorporated in a higher-level module performing 3D map-maintenance.

3. Far-range sensing: A persistent issue in autonomous mobility is the need to detect the shape of an object or an element of the scene at long distances. For example, a vehicle may need to locate the gap in a distant tree-line indicating a potential path. The use of traditional structure recovery algorithms such as conventional stereo image processing techniques is not sufficient because the baseline separation between in most autonomous vehicles, the separation between the stereo cameras cannot be made large enough to obtain the needed information. The subject invention, because it operates on sequences of images taken while the camera is moving, can perform stereo-like computations over time (as opposed to traditional snap-shot stereo). This allows for arbitrarily large baselines, and hence greatly enhanced depth estimation at a distance.

4. Easy incorporation of other modalities: Many outdoor robotic vehicles are equipped with multiple sensor modalities, such as A Light Amplification for Detection and Ranging (LADAR) system, an Inertial Navigation System (INS), or an odometry system. The present invention provides for easy integration and fusion of data from these modalities.

Although the exemplary embodiment of the invention is described in terms of an autonomous vehicle navigation system, it is contemplated that it may be practiced in the context of other image processing systems such as surveillance systems or satellite mapping systems.

The exemplary embodiments of the invention described below assume that the static aspects of the scene being imaged dominate any moving objects over the entire batch of images. The structure information generated by the exemplary processes is depth information with respect to the reference image.

One exemplary embodiment of the present invention, described below, iteratively refines estimates for ego-motion and structure, in a pyramid-based multi-resolution framework. The algorithm not only alternates between estimating ego-motion and structure, but also iterates over multiple image resolutions and over multiple sizes of support regions for correlation. The fundamental input to the algorithm is a batch of images obtained from a camera moving through the environment. Batches may be of arbitrary length, although significant image overlap is desirable within each batch. Large batches are useful for cases where increased accuracy is desired both in structure and ego-motion estimates. On the other hand, for low-latency, real-time operation, shorter batches can be used. In all cases, the results from successive batches can be daisy-chained together. When this is done, the final structure and ego-motion estimates for one batch form the initial estimates for the next batch. There is no requirement for image overlap among all batches. As a result, the structure estimate for each batch may be bootstrapped from the previous batch, allowing for rapid convergence of the iterative algorithm, and thus facilitating real-time implementation. When multiple batches are daisy-chained, the structure-constancy constraint is preserved across long chains of batches and an extended 3D-mosaic of the environment may be generated, as described below with reference to FIG. 6.

FIG. 1 is a flow-chart diagram that describes the overall operation of the algorithm. At step 110, an initial estimate for the 3D scene structure and ego-motion are obtained. In the materials that follow, this step is referred to as bootstrapping. If the images being analyzed are captured by an autonomous vehicle, this information may be obtained from other modalities in the vehicle such as a LADAR system, an inertial navigation system, a global positioning satellite (GPS) navigation system and/or an odometer.

The method is bootstrapped by providing a priori coarse estimates of inter-image relative orientation (ego-motion) and/or scene structure. These a priori estimates can come from a number of sources. After the first batch of images has been processed, the method may daisy-chain a second batch. That is to say, the system may use the final estimates of ego-motion and structure from a previous batch of images as the initial estimates for the current batch. When the batches are daisy-chained, the initial structure estimate may be the structure determined at the end of the previous batch process, while the initial ego-motion estimate may be obtained using Kalman Filter prediction based on the ego-motion in previous batches. If the camera rig resides on a vehicle equipped with other sensor modalities, these can also be used. A LADAR system, for example, may be used to bootstrap estimates of structure, while inertial sensors or an odometry system can be used to bootstrap ego-motion estimates. Alternatively, if the initial batch of images is obtained from a stereo camera pair, the plane corresponding to the least-squares affine registration transform between the left and right cameras can be used as an initial estimate of the ground plane horopter. Traditional stereo algorithms that generate a depth map from a single pair of images may also be used to bootstrap estimates of structure. In general, any a priori information may be used to generate the initial estimate, as the method tolerates relatively large errors. If no a priori information is available, the method initially sets the depth dimension of each pixel at infinity and sets the velocity of the camera to zero.

After data for the initial estimates of structure and ego-motion have been obtained, the method, at step 112, captures a batch of images. For the first batch of images, this step may be performed concurrently with the step of setting initial estimates for ego-motion and structure. This may be done, for example, for an autonomous vehicle including modalities that provide data while the images are being captured. In this type of a system, after the images have been captured but before they are analyzed at step 114, the data from these modalities is processed to provide the initial estimates. After a batch of images has been obtained at step 112, step 114 is executed which processes the images to update estimates of 3D scene structure and ego-motion. Details of step 114 are described below with reference to FIGS. 2, 3, 4 and 5. After the batch of images has been analyzed at step 114 and the estimates of ego-motion and structure have been updated, control transfers to step 112 to obtain and process the next batch of images.

As described below with reference to FIG. 3, as each batch of images is processed, estimates of the structure may be provided to a 3D mapping system that combines and reconciles the structure estimates into a 3D map of the scene.

Details of step 114 are shown in more detail in the structural block diagram of FIG. 2. Based on the initial coarse estimates of ego-motion and structure, the algorithm iteratively refines the estimates as shown in FIG. 2. The batch of images captured at step 112 include n images, $I_0$, $I_1$, ..., $I_{n-1}$, where $I_0$ designates the reference image 210, and $I_i$; $1 \leq i < n$ designate inspection images 112. Each inspection image is warped by a warp process 214 into the coordinate system of the reference image. The parameters used by this process include the bootstrapped ego-motion estimates for rotation $\Omega'_i$ and translation $T'_i$, and for the current estimate of structure $d'_p$ for all points p in the image. Each point p in the image is represented as a vector $p=(x, y)^T$. A depth dimension, in the exemplary embodiment of the invention, $1/z$, is added as the structure estimate for the point. In the materials that follow, the depth dimension for a point p is designated $d_p$ thus, $d_p = 1/z_p$. All points p and their structure information are relative to the reference image $I_0$.

FIG. 4 is a graphical depiction of multiple images taken by stereo cameras proceeding through a scene. As shown in FIG. 4, each inspection image $I_i$ is related to the reference image $I_0$ by a translation matrix T and a rotation matrix $\Omega$. Each inspection image is processed according to its respective translation and rotation matrixes in order to warp the inspection image into the coordinate system of the reference image.

After the inspection image has been warped by the process 214, the warped image 216 and the reference image 210 are decomposed into a Gaussian image and a plurality of Laplacian images by respective pyramid processes 218 and 220. Exemplary methods for forming the Gaussian and Laplacian images are described in U.S. Pat. No. 5,359,674 entitled PYRAMID PROCESSOR INTEGRATED CIRCUIT. The Gaussian/Laplacian decomposition is one example of a more general wavelet decomposition or a sub-band decomposition. Any of these methods produces images representing components of an image at various resolution levels, from a highest resolution level to a lowest resolution level. Although the exemplary embodiment of the invention is described in terms of a Gaussian/Laplacian decomposition, it is contemplated that other types of wavelet decomposition or sub-band decomposition may be used.

Next, the Laplacian images 222 and 224 at several resolution levels are correlated by correlation process 226. As described in more detail below, the correlation process may multiply corresponding points in the two images, find the absolute difference between the corresponding points or find the square of the difference. In the exemplary embodiment of the invention, the highest level (lowest resolution) Laplacian images are correlated first and the results of this operation are used to establish initial displacements for the correlation of successively lower levels. The result of the correlation process 266 is a plurality of correlation surfaces 228, m surfaces, corresponding to m Laplacian pyramid levels for the n images.

In the next step of the process, a surface fitting process 230 is run to fit a quadratic surface to each correlation surface for each point in every inspection image. After fitting the quadratic surfaces to the points, the process prunes all points having quadratic models that are not elliptic paraboloids and reduces each model to a respective set of quadratic coefficients 232.

All non-pruned correlation surfaces for each inspection image are summed. This global cumulative correlation surface is used by the processes 236 and 238 to compute incremental refinements of ego-motion ($\delta T_i$ and $\delta \Omega_i$) for that inspection image.

All non-pruned correlation surfaces for a particular point p, including the point p and a set of points adjacent to p, are summed over all inspection images. This local cumulative correlation surface is used by the process 234 to compute an incremental refinement of structure $\delta d_p$ at that point p for all points p.

The estimates, $\delta T_i$, $\delta \Omega_i$ and $\delta d_p$, are added to the previous estimates T' 252, $\Omega'$ 254 and $d_p'$ 256 in the adders 242, 244 and 240 to produce revised parameters T, $\Omega$ and $d_p$ that are applied to the warp process 214. The updated parameters become the estimated parameters T' 252, $\Omega'$ 254 and $d_p'$ 256 for the next iteration of the update algorithm on the current batch of images. The process of warping the inspection images, calculating their Laplacians and correlating the Laplacians of the warped images to the previously calculated Laplacians of the reference image in order to further update the rotation, translation and structure parameters continues for a predetermined number of iterations. After the current batch has been processed through the determined number of iterations, the final parameters for the batch become the estimated parameters for the next batch.

FIG. 3 is a block diagram of a processing system that may be used to implement the process shown in FIG. 2. The apparatus shown in FIG. 3 includes a video camera 310 and an optional second video camera 312 (shown in phantom). As set forth above, the present invention operates on both single-camera and stereo camera image sequences. The cameras 310 and 312 provide image data to an image capture processor 316. The processor 316 ensures proper timing of the cameras, capturing an image when requested by the control processor 326 and passing the captured image to a multi-frame memory 318. The multi-frame memory 318, in turn, is coupled to a warp processor 320, a pyramid processor 322 and a correlation processor 324.

As a batch of images is received, the warp processor 320, using the current estimated values for the rotation $\Omega'$ and translation T' parameters and the current estimated structure information $d_p'$, warps each of the inspection images into the coordinate system of the reference image and stores the result back into the multi-frame memory. Next, the pyramid processor 322 extracts the reference image and each inspection image and performs a pyramid decomposition, storing the resulting Laplacian pyramid levels for each image back into the multi-frame memory 318.

The correlation processor 324 correlates each Laplacian level for each inspection image to a corresponding Laplacian level for the reference image, using correlation information obtained from higher pyramid levels (lower resolution) to guide the correlation operation applied to lower pyramid levels. The correlation processor 324 also forms respective correlation surfaces of the lowest Laplacian level of each of the inspection images relative to the lowest Laplacian level of the reference image. The exemplary processor 324 also fits a parametric surface such as a quadratic surface to each correlation surface.

In the exemplary embodiment of the invention, the control processor 326 analyzes the respective correlation surfaces to detect and reject outliers and sums the correlation surfaces globally to obtain update estimates for $\Omega$ and T, and locally about each point p to obtain update estimates for $d_p$. The control processor also receives input signals from other optional sensors 314 (shown in phantom) which may be used, as described above, to initialize or augment the estimates for $\Omega'$, T' and $d_p'$.

FIG. 3 also shows an optional 3D mapping system 328 (shown in phantom) that receives structure information from the multi-frame memory and also receives updated estimates from the control processor 326. The mapping system 328 uses this information to generate and maintain a three-dimensional map of the scene through which the camera is moving.

The parametric models for the correlation surfaces are generated as described below. Consider a sequence of n images $I_0, I_1, \ldots, I_{n-1}$ of a static scene taken with a camera of focal length f. Let image $I_0$ be the reference image-coordinate system. Using the perspective projection camera model and the derivative of the 3D position of a moving object, the image flow of an image point $p=(x, y)^T$ in image $I_i$, $1 \leq i < n$, is given by equation (1).

$$v_i(p) = B_p \Omega_i + d_p A_p T_i \tag{1}$$

where $d_p = 1/z(p)$, $z(p)$ is the depth of the scene at p, and the values $\Omega_i$ and $T_i$ are the camera rotation and translation corresponding to image i, $B_p$ and $A_p$ are given in equations (2).

$$B_p = \begin{bmatrix} \frac{xy}{f} & -\left(f + \frac{x^2}{f}\right) & y \\ \left(f + \frac{y^2}{f}\right) & -\frac{xy}{f} & -x \end{bmatrix}, \text{ and} \tag{2}$$

$$A_p = \begin{bmatrix} -f & 0 & x \\ 0 & -f & y \end{bmatrix}$$

Let $v'_i(p)$ denote the image motion corresponding to estimates of ego-motion $\Omega'_i$, $T'_i$ and structure $d'_p$ from a previous iteration or resolution. Then, from equation (1), equation (3) describes the incremental image motion $\delta v_i(p)$ $$\delta v_i(p) = v_i(p) - v'_i(p) \tag{3}$$

$$= B_p(\Omega_i - \Omega'_i) + d_p A_p T_i - d'_p A_p T'_i$$

Next, let $I'_i$ denote the image formed by warping $I_i$ by the flow $v_i(p)$ for all points p. Denote the Laplacian-of-Gaussian images $L(I_0(p))$ and $L(I'_i(p))$ by $L_0(p)$ and $L'_i(p)$ respectively. Consider the correlation surface $C_{ip}$ formed by correlating $L'_i(p)$ with the reference $L_0(p)$. That is, for an image-to-image shift of s, $C_{ip}(s) = L_0(p) \otimes L'_i(p-s)$, where $\otimes$ denotes an operation on two corresponding pixels. In traditional stereo computations, $\otimes$ may be multiplication, absolute difference, or the square of the difference. Note that $C_{ip}$ depends on $\delta v_i(p)$. In fact, the procedure of correlation-based flow-estimation consists of finding the value of $\delta v_i(p) = \arg\max \Sigma C_{ip}(s)$ (if $\otimes$ represents multiplication) or $\delta v_i(p) = \arg\min \Sigma C_{ip}(s)$ if $\otimes$ is absolute difference or the square of the difference). In the materials that follow, the maximum and minimum calculations are referred to generically as extremum.

It is assumed that a second-order (quadratic) model $Q_{ip}$ can be fit to $C_{ip}$ for each point p. Let $v'_{ip}$ denote the current estimate of image flow in image $I_i$ at point p. $C_{ip}$ can be approximated by a Taylor expansion as shown in equation (4), $$C_{ip}(\delta v_{ip}) \approx Q_{ip}(v'_{ip}) + D_{ip}(v'_{ip})^T \delta v_{ip} + \frac{1}{2} \delta v_{ip}^T H_{ip}(v'_{ip}) \delta v_{ip} \tag{4}$$

where $$D_{ip} = \frac{\partial}{\partial \delta v_{ip}} Q_{ip}$$

(the vector of first derivatives), and $H_{ip}$ denotes the Hessian of $Q_{ip}$ (matrix of second derivatives). That is, $$Q_{ip}(x, y) = \frac{1}{2}(x \; y \; 1) \begin{bmatrix} 2q_{xx} & q_{xy} & q_x \\ q_{xy} & 2q_{yy} & q_y \\ q_x & q_y & q_o \end{bmatrix} \begin{pmatrix} x \\ y \\ 1 \end{pmatrix}$$

$$= q_{xx}x^2 + q_{xy}xy + q_{yy}y^2 + q_x x + q_y y + q_o$$

where $q_o$; $q_x$; $q_y$; $q_{xx}$; $q_{xy}$; and $q_{yy}$ are the quadratic coefficients. Then $$H_{ip} = \begin{bmatrix} q_{xx} & q_{xy} \\ q_{xy} & q_{yy} \end{bmatrix}, \text{ and } D_{ip} = \begin{pmatrix} q_x \\ q_y \end{pmatrix}$$

In the following sections, it is shown how equations (3) and (4) and the Chain Rule of differentiation may be combined to estimate ego-motion and structure in turn.

In order to update the estimate of ego-motion ($\Omega'_i$; $T'_i$) between frame 0 and frame i, the method finds the extremum of the global correlation surface $\Psi_i$ obtained by adding the correlation surfaces for all points in the image, $\Psi_i = \Sigma_p C_{ip}(\delta V_{ip})$. During each iteration, the process alternates between estimating the incremental refinements $\delta\Omega_i$ and $\delta T_i$. During estimation of $\delta\Omega_i$, the current estimates for translation and structure are held constant. In other words, the method performs gradient descent along each of the "axes" $\Omega_i$, $T_i$ and $d_p$ independently. Thus, to estimate the incremental refinement $\delta\Omega_i$, the method temporarily assumes $d_p = d'_p$ and $T_i = T'_i$. With this assumption, equation (5) flows from equation (3).

$$\frac{\partial v_i(p)}{\partial \Omega_i} = B_p \tag{5}$$

The extremum of $\Psi_i$, are found by taking the derivative of $\Psi_i$ with respect to $\Omega_i$, and equating it to 0. Equation (6) is obtained by applying By applying the Chain Rule, using equations (5) and (4), $$\frac{\partial \Psi_i}{\partial \Omega_i} = \sum_p \frac{\partial C_{ip}}{\partial v_i} \cdot \frac{\partial v_i}{\partial \Omega_i} = \sum_p B_p^T [D_{ip} + H_{ip} \delta v_{ip}] \tag{6}$$

because, for any vector a, $$\partial/\partial a\left(\frac{a^T H a}{2}\right) = Ha.$$

From equation (5), $\delta v_i(p) = B_p \delta \Omega_i$.

Substituting this identity into equation (6) and equating the result to 0 gives equation (7).

$$\sum_p B_p^T [D_{ip} + H_{ip} B_p \delta \Omega_i] = 0, \qquad (7)$$

whence $\delta \Omega_i = -\left[\sum_p B_p^T H_{ip} B_p\right]^{-1} \sum_p B_p^T D_{ip}$ Similarly, for estimation of the incremental refinement in $T_i$, it is temporarily assumed that $d_p = d'_p$ and $\Omega_i = \Omega'_i$. Hence, equation (8) derives from equation (3).

$$\frac{\partial v_i(p)}{\partial T_i} = d'_p A_p \qquad (8)$$

To find the extremum of $\Psi_i$, the derivative of $\Psi_i$ with respect to $T_i$, is equated to 0. Equation (9) derives by the Chain Rule, using equations (8) and (4), $$\frac{\partial \Psi_i}{\partial T_i} = \sum_p \frac{\partial C_{ip}}{\partial v_i} \cdot \frac{\partial v_i}{\partial T_i} = \sum_p d'_p A_p^T [D_{ip} + H_{ip} \delta v_{ip}] \qquad (9)$$

From equation (8), $\delta v_i(p) = d'_p A_p \delta T_i$. Substituting this identity into equation (9) and equating the result to 0 gives equation (10).

$$\sum_p d'_p A_p^T [D_{ip} + d'_p H_{ip} A_p \delta T_i] = 0, \qquad (10)$$

whence $\delta T_i = -\left[\sum_p (d'_p)^2 A_p^T H_{ip} A_p\right]^{-1} \sum_p d'_p A_p^T D_{ip}$ In order to update the estimate of structure $d'_p$, the process finds, for all points p, the extremum of the local correlation surface $\Psi_p$. This surface is obtained by adding the correlation surfaces for all points r in a small support region w around p, for all images $I_1, I_2, \ldots, I_{n-1}$. Thus $$\Psi_p = \sum_{i=1}^{n-1} \sum_{r \in w} C_{ir}(\delta v_{ip}).$$

During estimation of the incremental refinement $\delta d_p$, the current estimates for ego-motion (rotation and translation) are held constant. That is, for estimation of the incremental refinement in $\delta d_p$, it is temporarily assumed that $\Omega_i = \Omega'_i$ and $T_i = T'_i$ for all $i \in \{1, 2, \ldots, n-1\}$. Hence, equation (11) derives from equation 3.

$$\frac{\partial v_i(p)}{\partial d_p} = A_p T'_i, \text{ for all } i \in \{1, 2, \ldots, n-1\} \qquad (11)$$

To find the extremum of $\Psi_p$, the derivative of $\Psi_p$ with respect to $d_p$, is equated to 0. Equation (12) derives by the Chain Rule, using equations (11) and (4), $$\frac{\partial \Psi_p}{\partial d_p} = \sum_{i=1}^{n-1} \sum_{r \in w} \frac{\partial C_{ir}}{\partial v_i} \cdot \frac{\partial v_i}{\partial d_r} \qquad (12)$$

$$= \sum_{i=1}^{n-1} \sum_{r \in w} (A_r T'_i)^T [D_{ir} + H_{ir} \delta v_{ip}]$$

From equation (11), $\delta v_i(p) = A_p T'_i \delta d_p$. Substituting this identity into equation (12) and equating the result to 0 gives equation (13).

$$\sum_{i=1}^{n-1} \sum_{r \in w} (A_r T'_i)^T [D_{ir} + H_{ir} A_r T'_i \delta d_p] = 0, \qquad (13)$$

whence $\delta d_p = -\left[\sum_{i=1}^{n-1} \sum_{r \in w} (A_r T'_i)^T H_{ir} A_r T'_i\right]^{-1} \cdot \sum_{i=1}^{n-1} \sum_{r \in w} (A_r T'_i)^T D_{ir}$ Although FIG. 3 shows the operations performed by a group of special-purpose processors, it is contemplated that the operations shown in FIG. 2 may be performed on a single general purpose processor, under control of computer program instructions. It is also contemplated that these computer program instructions may reside on a carrier such as a magnetic or optical disk or on an audio-frequency or radio-frequency carrier wave.

Figure 5:
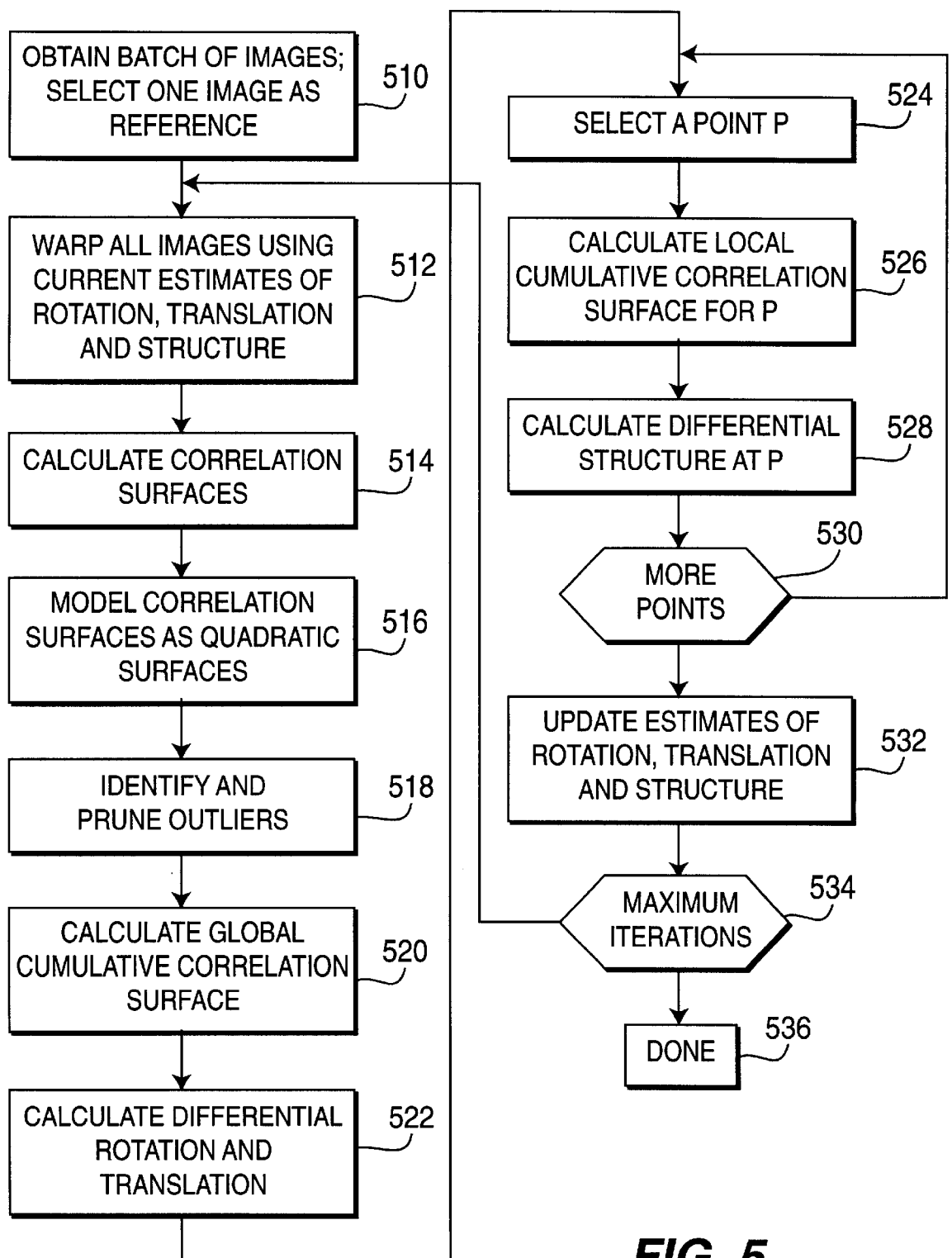
FIG. 5 is a flow-chart diagram of a method according to the present invention.

FIG. 5 is a flow-chart diagram that illustrates an exemplary embodiment of computer program instructions that may be used to implement the present invention. The program shown in FIG. 5 performs the functions of the update estimates of structure and ego-motion step 114, shown in FIG. 1.

The first step of the process shown in FIG. 5, step 510, obtains a batch of images and selects one of the images as a reference image. The remaining images in the batch are designated as inspection images. It is contemplated that any image in the batch may be selected as the reference image. Next, at step 512, each of the inspection images is warped into the coordinate system of the reference image using the current estimates of rotation, translation and structure ($\Omega'$, T' and $d_p'$). At step 514, the correlation surfaces are calculated for each image. At step 516, the process models each correlation surface as a parametric surface, such as a quadratic surface, and, at step 518, it identifies any surface that is not an elliptic paraboloid as an outlier and deletes that parametric surface from the data set.

Next, at step 520, the parametric correlation surfaces remaining in the data set are globally summed to form a cumulative correlation surface that spans the entire image space. At step 522, this global cumulative correlation surface is used to provide the update estimates $\delta \Omega$ and $\delta T$ that are used to update the current estimates $\Omega'$ and T'.

Next, at step 524, the process selects a point p and, at step 526, determines a local cumulative correlation surface for p. In the exemplary embodiment of the invention, the local correlation surfaces are defined with reference to the respective correlation surfaces generated for each of the inspection images. The local correlation surfaces corresponding to the point p are analyzed to define and delete outliers and the remaining local correlation surfaces for the point p are summed to form a plurality of cumulative local correlation surfaces. Alternatively, if the scene being imaged has very few moving objects, the local cumulative correlation surfaces may be generated from the global cumulative correlation surface by taking values corresponding the point p and points immediately surrounding point p in the image space of the reference image.

In the exemplary embodiment of the invention, a fixed number of image points (e.g. 4) in each direction are taken to define a matrix of, for example 9 by 9 points. It is contemplated that this number may be varied for different environments or even made adaptive. It may be desirable, for example, to expand the local environment of each point to include at least some image feature having high-frequency content.

At step 528, the process calculates the differential structure, $\delta d_p$. Next, At step 530, the process determines if there are more points in the image space to analyze. If so, control transfers to step 524, described above, to select the next point. After each point in the image has been analyzed, step 532 is executed which updates the estimates of rotation, translation and structure that are applied by the warping operation of step 512. At step 534, the process determines if more iterations are to be performed on the current batch of images to further refine the estimates of rotation, translation and structure. If so, control then transfers to step 512, described above, to warp each of the inspection images into the image coordinate system of the reference image, using the updated estimates of rotation, translation and structure determined at step 532.

If at step 534, the process determines that the current batch of images has been processed through the maximum number of iterations, the process ends at step 536.

Figure 6:
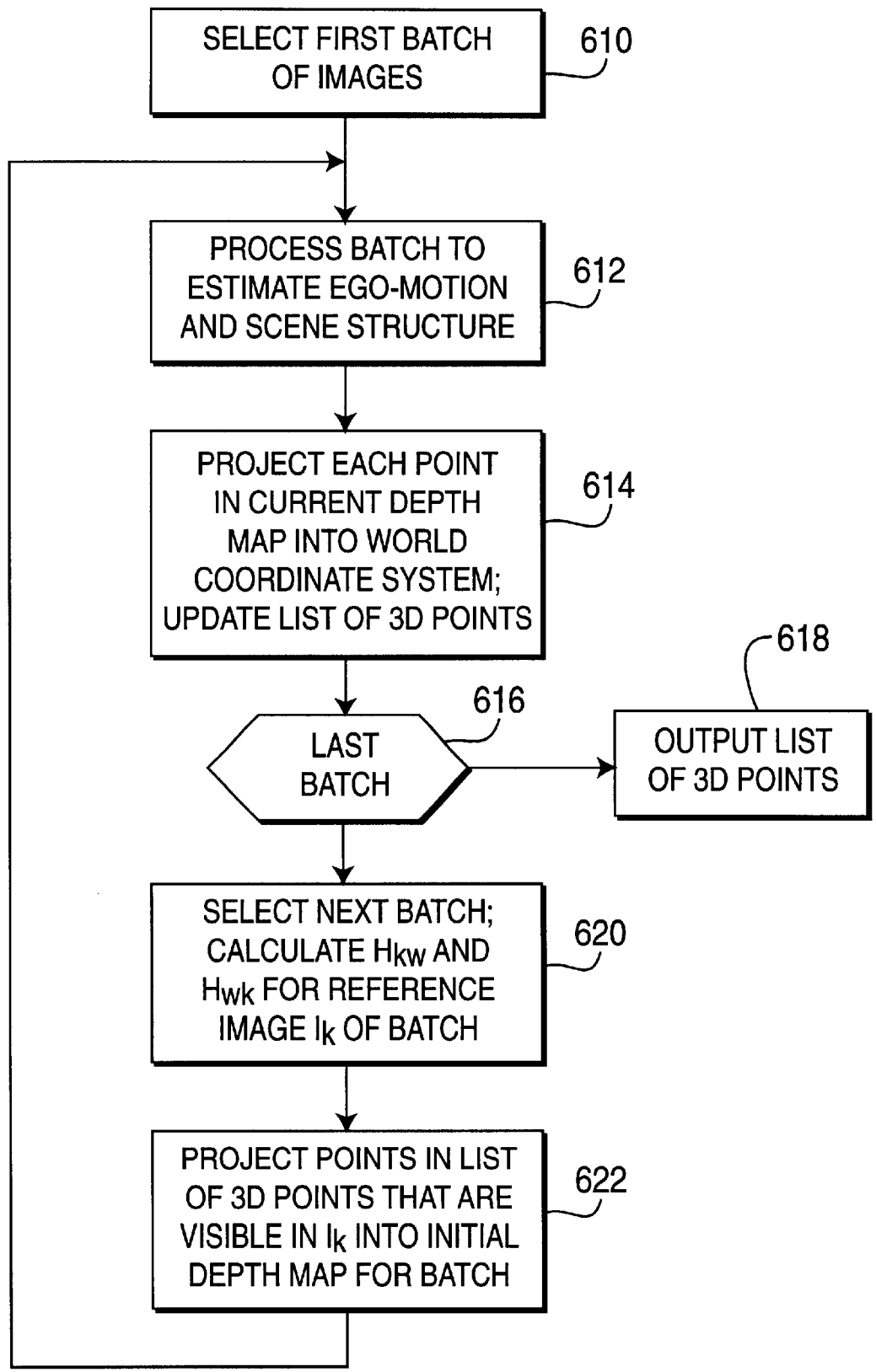
FIG. 6 is a flow-chart diagram of an application for the processes shown in FIGS. 1–5 that generates a depth map of a scene which is traversed by an autonomous vehicle.

FIG. 6 illustrates an exemplary application of the egomotion and scene structure algorithm described above. In this application, a depth-map of a scene is generated from images captured by an autonomous vehicle as it moves through the scene. As described above, the images captured by the vehicle are grouped into batches. The size of each batch, however, is limited to a few frames for two reasons. First, for frames that are far apart in a sequence, the small rotation assumption is likely to be violated. Second, for a long sequence, there may be little or no overlap between the first and last frame in the sequence and therefore a batch method cannot be used easily (because everything is computed in the coordinate system of the first frame).

Individual batches provide local structure information. In this exemplary application, the global structure is obtained by combining the structure information recovered for individual batches, effectively building a 3D mosaic. This approach also has the advantage of producing results after processing every batch (low latency), which is important in the navigation context.

To describe the operation of the exemplary application, it is assumed that seven frames are processed, frames $I_0$, $I_1$, $I_2$, $I_3$, $I_4$, $I_5$ and $I_6$. These frames are grouped into three batches: batch 0 ($I_0$, $I_1$, $I_2$); batch 1 ($I_2$, $I_3$, $I_4$); and batch 2 ($I_4$, $I_5$, $I_6$) For the first batch, the homogenous transformation between frame $I_0$ (the first frame of the sequence) and world coordinate system is $H_{0w}$, which is assumed to be known a priori. This is not a restrictive assumption, as the "world" coordinate system can be arbitrary (in the limit $H_{0w}$ could be the identity transform, in which case the global coordinate system is the same as for frame 0).

For batch 1 the reference frame is $I_2$, and the reference camera-to-world transformation $H_{2w}$ needs to be computed. $I_2$, however, is an inspection image in batch 0, thus after processing batch 0 the relative camera motion between $I_2$ and $I_0$ is described as a translation $T_{20}$ and rotation $\Omega_{20}$ see FIG. 4). In general, if r and k are the reference frames for the current and next batch respectively, $\Omega_{kr}$, $T_{kr}$ give the relative motion.

The rotation term $\Omega_{kr}=(\Omega_1\ \Omega_2\ \Omega_3)^T$ describes an axis through the origin, and the angle of rotation is $\alpha=\|\Omega_{kr}\|$. The corresponding rotation matrix $R_{kr}$ can be computed using the Rodrigues formula, shown in equation (14), which is described in a text by O. Faugeras entitled *Three-Dimensional Computer Vision: a Geometric Viewpoint,* The MIT Press at page 150.

$$R_{kr} = I + \frac{\sin\alpha}{\alpha}W + \frac{1-\cos\alpha}{\alpha^2}W^2, \tag{14}$$

where I is the identity matrix and W is a 3×3 antisymmetric matrix as shown in is equation (15).

$$W = \begin{bmatrix} 0 & -\omega_3 & \omega_2 \\ \omega_3 & 0 & -\omega_1 \\ -\omega_2 & \omega_1 & 0 \end{bmatrix} \tag{15}$$

Thus the transformation from the coordinate system of frame k to that of frame r in homogenous coordinates is given by equation (16).

$$H_{kr} = \begin{bmatrix} R_{kr} & T_{kr} \\ 0 & 1 \end{bmatrix} \tag{16}$$

Then the camera-to-world and world-to-camera transformation for frame k are given by equations (17).

$$H_{kw}=H_{kr}H_{rw},\ H_{wk}=H_{kw}^{-1} \tag{17}$$

After processing the first batch (frames $I_0$ to $I_3$) using the algorithm described above with reference to FIGS. 1–5, the structure information is in the form of a depth map $D_o$ in the coordinate system of frame $I_0$ (the reference frame for the first batch). In order to bootstrap the processing of the next batch (frames $I_2$ to $I_5$), the structure information is converted to a depth map $D_i$ in the coordinate system of the new reference frame, frame $I_2$.

In general, propagating the depth map from frame $I_r$ to frame $I_k$ is done by projecting all points d in $D_r$ into the world coordinate system (t=$H_{rw}$d) and then projecting them back into $D_k$. The test fo the visibility of a 3D point t in image $I_k$ with focal length f is given by equation (18).

$$\text{visible}(t, I_k, f) = \text{abs}\left(\frac{xf}{z}\right) < \frac{1}{2}\text{width}(I_k) \text{ and} \tag{18}$$

$$\text{abs}\left(\frac{yf}{z}\right) < \frac{1}{2}\text{height}(I_k), \text{ where}$$

$$(x\ y\ z\ 1)^T = H_{wk}t$$

This test does not eliminate points that were visible in the previous batch and have become invisible due to occlusions. Using image correlation criteria, this test can be extended to handle occlusion as well as visibility within the field of view of the reference frame.

Only the points t that are visible in $I_k$ are used for initializing the new depth map. Furthermore, the projection of visible points in the new depth map is not exact, since the image coordinates of the projection (xf/z and yf/z in equation (18)) are not necessarily integers. In the exemplary application, the new depth map is used only as an initial estimate for the next batch, consequently, it does not need to be exact. Therefore the depth value z is assigned with a resolution of the nearest pixel from (xf/z, yf/z).

The resulting depth map may have holes which, in the exemplary embodiment, are filled by averaging the valid neighboring values. There may also be regions that were not visible in the prior image batches and, thus, for which there is no depth information. These regions may be filled by fitting a number of planar tiles to the region of known depth and extending them up to the border. The next batch is then processed using this new depth map as an initial shape estimate.

FIG. 6 is a flow-chart diagram that illustrates the exemplary 3D mapping process. This process may be implemented, for example, as the 3D mapping system 328 shown in FIG. 3. The input data to the process consists of the camera-to-world transformation for the first reference frame, $H_{ow}$, the focal length, f, of the camera and some coarse ego-motion and shape estimates for the first batch of images. Note that, as described above, these initial estimates may be very coarse (such as a fronto-parallel plane at infinity for shape and zero ego-motion). The output data provided by the process is a list L of 3D points in world coordinates (initially empty) and the camera-to-world transformations $H_{iw}$ for every frame i.

At step 610, the process selects a first batch of images. As described above, this batch desirably includes only a few consecutive images. Next, at step 612, the process applies the algorithm described above with reference to FIGS. 1–5 to the current batch, with reference frame r. The result is a dense depth map image I in the current batch $(\Omega_{ir}, T_{ir})$. The next step in the process, step 612 projects every point in the current depth map into the world coordinate system by applying the transform $H_{rw}$ and adds each point to the list, L, of 3D points as shown in equation (19).

$$L = L \cup \{H_{rw} d | d \in D_r\} \qquad (19)$$

After step 614, the process executes step 616 to determine if the batch that was just processed is the last batch in the sequence. If it is, then, at step 618, the list of points L is provided as the output data of the process. If the current batch is not the last batch then control transfers to step 620. At step 620, the process selects the next batch. In the exemplary embodiment, the reference frame for this batch is assumed to be $I_k$, the last frame in the previous batch. The process uses $H_{rw}$, $\Omega_{kr}$, and $T_{kr}$, determined in the processing of the last batch, to compute camera-to-world and world-to-camera transformations $H_{kw}$, $H_{wk}$ for $I_k$ using equations (14) to (16).

Next, at step 622, the process projects the points in L that are visible in frame $I_k$ into $D_k$ (the initial depth estimate for the next batch) and removes these points from L, as described in equations (20).

$$L' = \{t \in L | \text{visible}(t, I_k, f)\}$$
$$D_k = \{H_{wk} t' | t' \in L'\}$$
$$L = L \setminus L' \qquad (20)$$

After processing the last batch, L is a list of dense 3D points in the world coordinate system. For visualization, the points are projected on a plane and Delaunay triangulation is used to generate a mesh suitable for texture mapping. No additional parametric surface fitting is used.

Although the present invention has been described in terms of exemplary embodiments, it is contemplated that it may be practiced as described above with modifications that fall within the scope of the following claims.

What is claimed:

1. A method for estimating both three-dimensional (3D) scene structure and ego-motion from a batch of images of the scene obtained by a camera as it moves through the scene, the method comprising the steps of:

defining a reference image and a plurality of inspection images in the batch of images;

providing an initial estimate of the ego-motion and the scene structure for the batch of images;

responsive to the initial estimate of ego-motion and scene structure, globally correlating each of the inspection images to the reference image to define a global ego-motion constraint for all of the inspection images relative to the reference image;

refining the initial estimate of ego-motion based on the global ego-motion constraint;

responsive to the initial estimate of ego-motion and scene structure, locally correlating each of the inspection images to the reference image to define a plurality of local structure constraints for all of the inspection images relative to the reference image;

responsive to the plurality of local structure constraints, refining the initial estimate of scene structure in respective regions of the reference image corresponding to the plurality of local structure constraints.

2. A method according to claim 1, further including the step of warping each inspection image into a coordinate system defined by the reference image using the initial estimates of ego-motion and scene structure to define a respective plurality of warped inspection images, prior to the step of defining the global ego-motion constraint; wherein the steps of globally and locally correlating the inspection images to the reference images correlate the warped inspection images to the reference image.

3. A method according to claim 2, wherein the step of defining the global ego-motion constraint includes the steps of:

forming a wavelet decomposition of the reference image and each of the warped inspection images to provide a plurality of resolution levels for each of the reference image and the warped inspection images; and correlating each resolution level of each inspection image to a corresponding resolution level of the reference image, using correlation results of lower resolution levels to guide the correlating of higher resolution levels.

4. A method according to claim 2, wherein the step of defining the local structure constraint includes the steps of:

forming a wavelet decomposition of the reference image and each of the warped inspection images to provide a plurality of corresponding resolution levels for each of the reference image and the warped inspection images; and selecting a point in the reference image;

defining a window of points around the selected point;

correlating, in each resolution level of each inspection image, a window of points corresponding to the defined window of points to a respective window of points in the corresponding resolution level of the reference image, wherein the correlation results of lower resolution levels are used to guide the correlating of higher resolution levels.

5. A method according to claim 1, wherein the estimate of ego-motion includes estimates of rotation and translation and wherein:

the step of globally correlating each of the inspection images to the reference image includes the steps of:

for each inspection image of the plurality of inspection images, determining a correlation surface defining the correlation between the inspection image and the reference image to provide a respective plurality of correlation surfaces fitting each correlation surface of the plurality of correlation surfaces to a respective parametric surface to provide a respective plurality of parameterized correlation surfaces;

classifying each parameterized correlation surface as a good correlation surface or as a bad correlation surface; and summing the good correlation surfaces to the relative exclusion of the bad correlation surfaces to provide a cumulative correlation surface; and the step of refining the initial estimate of ego-motion includes the steps of:

assigning fixed values for the estimates of translation and scene structure;

calculating a differential adjustment to the rotation estimate;

assigning fixed values for the estimates of rotation and scene structure; and calculating a differential adjustment to the translation estimate.

6. A method according to claim 5, wherein the step of classifying each correlation surface as a good correlation surface or as a bad correlation surface includes the steps of:

determining whether each parameterized correlation surface corresponds to an elliptic paraboloid;

designating the parameterized correlation surfaces that correspond to elliptic paraboloids as good correlation surfaces and the quadratic correlation surfaces that do not correspond to elliptic paraboloids as bad correlation surfaces.

7. A method according to claim 1, wherein the step of providing an initial estimate of the ego-motion and scene structure uses information provided by sensing modalities that are independent of the camera.

8. A method according to claim 1, wherein the batch of images is provided by a single camera.

9. A method according to claim 1, wherein the batch of images are stereo images provided by two cameras having a fixed separation.

10. A method according to claim 1, wherein the step of providing an initial estimate of ego-motion and scene structure obtains the initial estimate of scene structure by preparing a depth map using the reference image and the inspection image that is the stereo image corresponding to the reference image.

11. Apparatus for estimating both three-dimensional (3D) scene structure and ego-motion from a batch of images of the scene comprising:

at least one camera which obtains a batch of images including a reference image and a plurality of inspection images as the at least one camera moves through the scene;

means for providing an initial estimate of the ego-motion and the scene structure for the batch of images;

a correlation processor, responsive to the initial estimate of ego-motion and scene structure, 1) to globally correlate each of the inspection images to the reference image, the correlation processor defining a global ego-motion constraint for all of the inspection images relative to the reference image and 2) to locally correlate each of the inspection images to the reference image to define a plurality of local structure constraints for all of the inspection images relative to the reference image;

a processor, coupled to the correlation processor to define a differential ego-motion estimate from the global ego-motion constraint and to define a differential structure estimate from the plurality of local structure constraints;

a plurality of adders which add the differential ego-motion estimate to the initial ego-motion estimate to provide a refined ego-motion estimate and which add the differential structure estimate to the initial structure estimate to provide a refined structure estimate.

12. Apparatus according to claim 11, further including a warping processor which, responsive to the initial ego-motion and structure estimates, warps each inspection image into a coordinate system defined by the reference image and provides the warped inspection images to the correlation processor.

13. Apparatus according to claim 12, further including:

a pyramid processor which performs a wavelet decomposition of the reference image and each of the warped inspection images to provide a plurality of corresponding resolution levels for each of the reference image and the warped inspection images;

wherein, the correlation processor correlates each resolution level of each inspection image to a corresponding resolution level of the reference image.

14. Apparatus according to claim 13, wherein the correlation processor, for each point in the reference image, defines a window of points around the selected point, correlates, in each resolution level of each inspection image, a window of points corresponding to the defined window of points to a respective window of points in the corresponding resolution level of the reference image.

15. Apparatus according to claim 11, further comprising additional sensing modalities that provide information regarding one of scene structure and ego-motion, and the apparatus further includes a processor which processes the information provided by the additional sensing modalities to provide the initial estimates of ego-motion and scene structure.

16. Apparatus according to claim 15, wherein the additional sensing modalities are selected from a group consisting essentially of a light amplification for detection and ranging (LADAR) system, an inertial navigation system and an odometry system.

17. Apparatus according to claim 11, wherein the at least one camera consists of a single camera.

18. Apparatus according to claim 11, wherein the at least one camera consists of two cameras having a fixed separation and the batch of images are corresponding stereo images.

19. Apparatus according to claim 18, further comprising a processor which receives the reference image and corresponding stereo image from the two cameras and processes the two images to generate a depth map of the scene wherein the depth map is provided as the initial estimate of scene structure.

20. An article of manufacture comprising a carrier containing computer program instructions, the computer program instructions controlling a general purpose computer to estimate both three-dimensional (3D) scene structure and ego-motion from a batch of images of the scene obtained by a camera as it moves through the scene, the computer program instructions causing the computer to perform the steps of:

defining a reference image and a plurality of inspection images in the batch of images;

providing an initial estimate of the ego-motion and the scene structure for the batch of images;

responsive to the initial estimate of ego-motion and scene structure, globally correlating each of the inspection images to the reference image to define a global ego-motion constraint for all of the inspection images relative to the reference image;

refining the initial estimate of ego-motion based on the global ego-motion constraint;

responsive to the initial estimate of ego-motion and scene structure, locally correlating each of the inspection images to the reference image to define a plurality of local structure constraints for all of the inspection images relative to the reference image;

responsive to the plurality of local structure constraints, refining the initial estimate of scene structure in respective regions of the reference image corresponding to the plurality of local structure constraints.

21. An article of manufacture according to claim 20, wherein the computer program instructions further cause the computer to warp each inspection image into a coordinate system defined by the reference image using the initial estimates of ego-motion and scene structure to define a respective plurality of warped inspection images, prior to the step of defining the global ego-motion constraint; wherein, in the steps of globally and locally correlating the inspection images to the reference images the computer program instructions cause the computer to correlate the warped inspection images to the reference image.

22. An article of manufacture according to claim 21, wherein the computer program instructions further cause the computer to form a Gaussian/Laplacian decomposition of the reference image and each of the warped inspection images to provide a plurality of corresponding resolution levels for each of the reference image and the warped inspection images and cause the computer to correlate each resolution level of each inspection image to the corresponding resolution level of the reference image.

23. An article of manufacture according to claim 22, wherein the computer program instructions that cause the computer to define the local structure constraint include computer program instructions that cause the computer to form a wavelet decomposition of the reference image and each of the warped inspection images to provide a plurality of corresponding resolution levels for each of the reference image and the warped inspection images, select a point in the reference image, define a window of points around the selected point, and correlate, in each Laplacian level of each inspection image, a window of points corresponding to the defined window of points to a respective window of points in the corresponding resolution level of the reference image.

24. A method of generating a depth map of a scene from a sequence of images of the scene obtained by a camera moving through the scene, the method comprising the steps of:

a) selecting a first batch of images from the sequence of images;

b) processing the first batch of images to generate estimates of ego-motion of the camera and structure of the scene;

c) projecting the estimated structure of the first batch of images into a world coordinate system;

d) selecting a further batch of images from the sequence of images, the further batch of images having a reference image that is included in a previous batch of images;

e) using the estimated ego-motion for the previous batch of images, mapping the structure estimate for the previous batch of images into a coordinate system defined by the reference image of the further batch of images;

f) processing the further batch of images to generate further estimates of ego-motion of the camera and structure of the scene;

g) projecting the further estimated structure into the world coordinate system to be combined with the previously projected estimated structure;

h) repeating steps d) through g) until a last batch of images in the sequence of images has been processed; and i) providing the combined projected estimated structure as the depth map.

25. A method according to claim 24, further including the step of removing the mapped structure estimate from the combined projected estimated structure before processing the further batch of images.

26. A method according to claim 24, wherein the step of processing the further batch of images to generate further estimates of ego-motion of the camera and structure of the scene includes the steps of:

defining a reference image and a plurality of inspection images in the further batch of images;

receiving the mapped structure estimate as an initial estimate of the scene structure for the further batch of images;

responsive to the initial estimate of scene structure, globally correlating each of the inspection images to the reference image to define a global ego-motion constraint for all of the inspection images relative to the reference image;

refining the initial estimate of ego-motion based on the global ego-motion constraint;

responsive to the initial estimate of ego-motion and scene structure, locally correlating each of the inspection images to the reference image to define a plurality of local structure constraints for all of the inspection images relative to the reference image;

responsive to the plurality of local structure constraints, refining the initial estimate of scene structure in respective regions of the reference image corresponding to the plurality of local structure constraints.

* * * * *